July 25, 1933.   F. REUTTER ET AL   1,919,860
HOSE COUPLING
Filed June 17, 1932
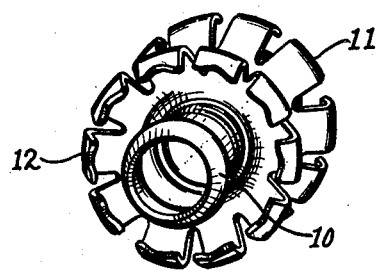
Fig. 1.
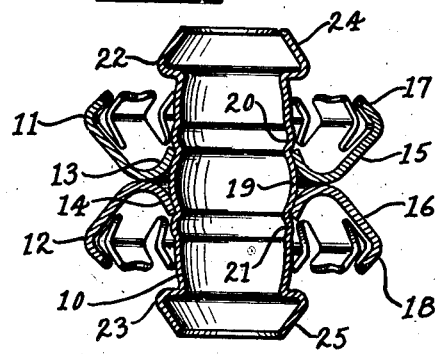
Fig. 2.
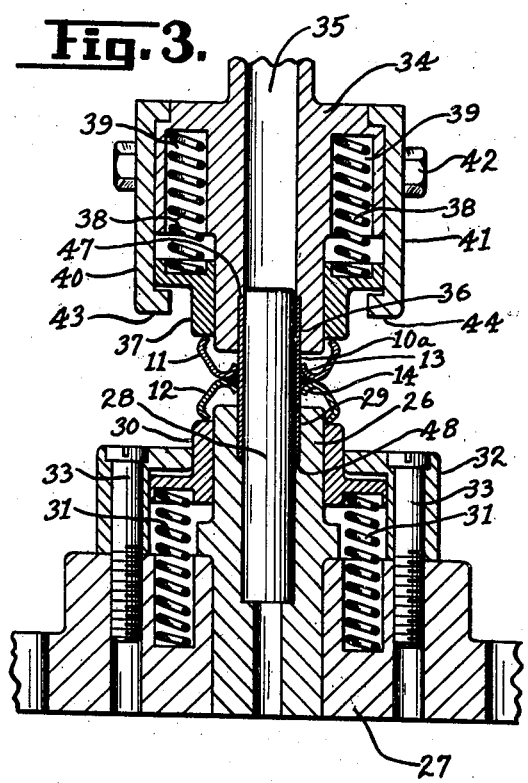
Fig. 3.
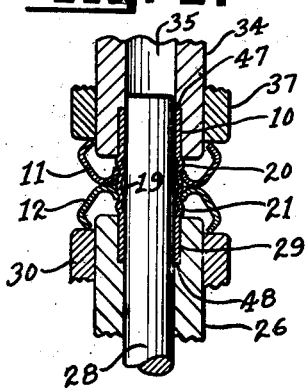
Fig. 4.
Fig. 6.
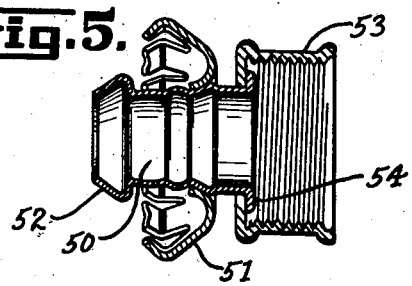
Fig. 5.
INVENTORS
*Frederick Reutter.*
BY *John H. Goss.*
H. G. Manning
ATTORNEY Patented July 25, 1933

1,919,860

UNITED STATES PATENT OFFICE

FREDERICK REUTTER AND JOHN H. GOSS, OF WATERBURY, CONNECTICUT, ASSIGNORS TO SCOVILL MANUFACTURING COMPANY, OF WATERBURY, CONNECTICUT, A CORPORATION OF CONNECTICUT

HOSE COUPLING

Application filed June 17, 1932. Serial No. 617,784.

This invention relates to hose connectors or couplings, and more particularly to a clincher hose coupling which may be used to readily connect two sections of hose.

One object of the present invention is to provide a hose clincher coupling of the above nature comprising a pair of clincher hose engaging members, assembled back to back upon a tubular formed blank, the latter having portions expanded outwardly against said clincher members for rigidly securing the parts together.

A further object is to provide a hose clincher coupling of the above nature in which the tubular blank is provided with three outwardly extending ring sections or beads forced into contact with said clincher members, whereby said members will be positively held against rotative or longitudinal movements.

A further object is to provide a hose coupling of the above nature which will be simple in construction, inexpensive to manufacture, easy to install and manipulate, compact, ornamental in appearance, and very efficient and durable in use.

With these and other objects in view there have been illustrated on the accompanying drawing, three forms in which the invention may be conveniently embodied in practice.

In the drawing:

Fig. 1 represents a perspective view of the first form of clincher hose coupling.

Fig. 2 is a longitudinal sectional view of the same.

Fig. 3 is a vertical sectional view of the die apparatus used in manufacturing the clincher hose couplings, the parts being shown in their relative positions just prior to the forming operation.

Fig. 4 is a fragmentary sectional view of a portion of the forming dies and the coupling after the forming operation has been completed.

Fig. 5 is a sectional view of a modified form of hose coupling for connection to one end of a hose.

Fig. 6 is a sectional view of another form of hose coupling, showing a modified form of clincher member attached thereto with one spur in locking position.

Referring now to the drawing in which like reference numerals denote corresponding parts throughout the several views, the numeral 10 indicates a formed tubular blank which comprises the central connecting member in the completed article. Surrounding the middle section of the tubular blank 10 are a pair of hose engaging clincher members 11 and 12 having a pair of oppositely disposed interior collars 13 and 14 which are adapted to slip loosely over the outside periphery of a smooth tubular blank 10a as shown in Fig. 3. The clincher members 11 and 12 are formed with a plurality of outwardly inclined fingers or lugs 15 and 16 having inturned outer pointed ends forming spurs 17 and 18, which are adapted to bite into a hose, not shown, when said fingers 15 and 16 are hammered inwardly against the hose.

In order to permanently secure the juxtaposed clincher members 11 and 12 upon the tubular blank 10a in such a manner as to prevent relative longitudinal sliding of said parts, the blank is adapted to be expanded or buckled outwardly to form three rings or beads 19, 20 and 21, as shown in Figs. 2 and 4, said beads being formed on the outside and inside of said clincher member collars 13 and 14. Moreover, the central apertures in said collars 13 and 14 are preferably made slightly out-of-round or ovalized so as to positively lock the clincher members 11 and 12 against rotation upon said blank 10.

The outer ends of the blank 10 are provided with a pair of enlarged conical beads 22 and 23 having inwardly converging extremities 24 and 25 which are adapted to be inserted within the hose to be repaired.

The process of assembling the relative parts of the hose clincher coupling together is illustrated in the apparatus shown in Fig. 3 by means of which the smooth tubular blanks 10a and the two hose clincher members 11 and 12 are adapted to be assembled. Figs. 2 and 4 show the appearance of the completed hose coupling.

Referring to Fig. 3, the numeral 26 indicates a lower die or anvil supported within a stationary die bed 27. The anvil 26 is provided with a vertical post or mandrel 28 over which the original smooth tubular blank 10a may be readily slipped and seated within a circular socket 29 formed in the upper part of the anvil 26. A sliding sleeve 30 is fitted around said anvil 26 and is adapted to be supported upon a plurality of helical compression springs 31, and said sleeve 30 may be slidably encased within an inverted cup-shaped member 32 secured to the die bed 27, as by screws 33.

Located above and in axial alinement with the stationary anvil 26 is an upper reciprocating die 34 having a central bore 35 slidably fitted over the mandrel 28. The lower part of the central bore 35 is formed with an annular recess 36 adapted to fit over the upper part of the tubular blank 10a. The upper die 34 is also provided with a sliding sleeve 37 which is adapted to be compressed against a plurality of helical springs 38 encased in sockets 39 formed in said die 34. The sliding sleeve 37 is adapted to be held in place at the lower end of the die 34 by means of a pair of plates 40 and 41 secured to the opposite sides of said die, as by screws 42. The lower edges of the plates 40 and 41 are provided with inturned flanges 43 and 44 against which the sliding sleeve is adapted to engage and be held in operating position.

*Operation*

In operation, the process of assembling a clincher hose coupling is as follows:

The tubular blank 10a will first be slipped over the vertical mandrel 28 and seated within the circular socket 29 formed in the lower anvil 26. The two clincher members 11 and 12 will next be loosely assembled upon the blank 10a and supported by means of the lower sliding sleeve 30.

The upper die 34 will then be caused to descend and move to the position shown in Fig. 3, whereupon the ends of the tubular blank 10a will be abutted against shoulders 47 and 48 formed at the ends of the recesses 36 and 29 in the upper and lower dies 34 and 26 respectively. As the die 34 continues to descend, the tubular blank 10a will be caused to expand or buckle outwardly forming three locking beads 19, 20 and 21, as clearly shown in Figs. 2 and 4.

It will be understood that since the center apertures in the clincher members 11 and 12 are made slightly non-circular or ovalized, the metal in the tubular blank 10a will be expanded into contact with said apertures so as to produce a positive locking engagement therewith. When the clincher members 11 and 12 have been assembled to the blank 10 by the above described method, the upper die 34 will then be retracted and the formed tubular blank 10 removed from the mandrel by any mechanism, not shown. The end of the blank 10 will be finally headed into the conical shape shown in Figs. 1 and 2 by mechanism not shown.

The modified form of the invention shown in Fig. 5 represents a hose coupling having a central tubular blank 50 with only one outer attached clincher member 51. The blank 50 is provided on one end with the usual conical head 52 while the opposite end thereof is provided with a loosely fitted coupling nut 53 held in place by an outwardly formed end flange 54. This modified form is for the purpose of attaching a hose to any standard fitting such as a faucet, pipe thread, hose nozzle, or the like.

In the second modified form shown in Fig. 6, the numeral 55 represents a formed tubular blank, one end of which has the usual conical head 56, while the other end is provided with an enlarged integral shell 57 having a peripheral rolled thread 58 formed thereon. A single clincher member 59 of a modified type may be attached to the tubular blank 55 in the same manner as described above for the first two forms. The clincher member 59 has a plurality of inclined clamping fingers 60 having inwardly and outwardly extending V-shaped hose engaging spurs 61 on their extremities.

The type of clincher coupling shown in Fig. 6 with the Z-shaped prongs, when assembled upon the end of a hose 62, will have less tendency to injure the material thereof or weaken the joint than the former type of coupling having prongs with sharp teeth embedded in the hose.

A further advantage of this modified type of coupling is that the out-turned extremities 62 of the spurs 61 serve to clinch the hose against the enlarged head on the end of the inner tube, thus effectually locking said hose in a doubly bent position, as clearly shown in Fig. 6.

While there have been disclosed in this specification several forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a clincher hose coupling, a tubular member for partial insertion into the end of a hose, a hose engaging member surrounding said tubular member and having an inturned section for engaging the outer surface of said hose, and outturned means secured to said inturned section for preventing the formation of a sharp edge which might cut into said hose.

2. In a clincher hose coupling, a tubular member for partial insertion into the end of a hose, a hose clinching member rigidly secured to said tubular member and having a series of inturned prongs for pressing into the outer surface of said hose, and means secured to the ends of said prongs for providing a smooth non-cutting engagement with said hose.

In testimony whereof, we have affixed our signatures to this specification.

FREDERICK REUTTER.
JOHN H. GOSS.